United States Patent [19]
Kobayashi et al.

[11] Patent Number: 5,939,180
[45] Date of Patent: Aug. 17, 1999

[54] THERMOPLASTIC RESIN FOAM AND METHOD OF PREPARING THE SAME

[75] Inventors: Tomoyuki Kobayashi; Kenji Miyazaki, both of Kyoto; Michiaki Sasayama, Tuzuki-gun, all of Japan

[73] Assignee: Sekisui Kagaku Kogyo Kabushiki Kaisha, Osaka-fu, Japan

[21] Appl. No.: 08/687,385

[22] PCT Filed: Dec. 14, 1994

[86] PCT No.: PCT/JP94/02088

§ 371 Date: Sep. 23, 1996

§ 102(e) Date: Sep. 23, 1996

[87] PCT Pub. No.: WO96/18671

PCT Pub. Date: Jun. 20, 1996

[51] Int. Cl.$^6$ .................................................. B32B 3/26
[52] U.S. Cl. ........................................ 428/304.4; 264/45.4
[58] Field of Search .............................. 428/304.4, 318.4, 428/319.7, 310.5, 316.6; 521/50; 264/45.4, 109

[56] References Cited

U.S. PATENT DOCUMENTS

| | | | |
|---|---|---|---|
| 2,983,692 | 5/1961 | D'Alelio | 260/2.5 |
| 2,983,962 | 5/1961 | Merz et al. | 264/45.4 |
| 3,914,359 | 10/1975 | Bevan | 264/45.3 |

FOREIGN PATENT DOCUMENTS

| | | |
|---|---|---|
| 57-29252 | 6/1982 | Japan . |
| 59-223733 | 12/1984 | Japan . |

*Primary Examiner*—Christopher Raimund
*Attorney, Agent, or Firm*—Armstrong, Westerman, Hattori, McLeland & Naughton

[57] ABSTRACT

A foam molding is disclosed which is light, excellent in bending strength, and excellent in balance between compressive strength and compression permanent strain. The foam molding comprises thermoplastic resin high expanded foams whose overall outer surfaces are covered with thermoplastic resin low-expanded-foam thin layers. The foams are thermally fused with each other through the aforementioned low-expanded-foam thin layers.

6 Claims, 3 Drawing Sheets

THERMOPLASTIC RESIN FOAM AND METHOD OF PREPARING THE SAME

TECHNICAL FIELD

The present invention relates to a thermoplastic resin foam and a method of preparing the same.

BACKGROUND TECHNIQUE

A thermoplastic resin foam, which is light and excellent in heat insulation, flexibility and formability etc., is widely employed in various heat insulators such as a roof insulator or a floor insulator, a cushioning material, and various interior materials such as an interior material for a vehicle.

In general, a method carrying out a step of pre-expanding thermoplastic resins for obtaining expandable beads and then carrying out a step of charging the expandable beads in a mold for secondarily expanding the same and fusing the beads with each other thereby obtaining a molding is known as a method of preparing the aforementioned thermoplastic resin foam.

In the foam molding which is obtained by the aforementioned method of preparing a thermoplastic resin foam, however, strength, particularly bending strength is disadvantageously insufficient. In the bead foam molding which is obtained from the aforementioned expandable beads, for example, a non-expandable thin film is formed on the surface of each bead. Therefore, high compressive strength can be expected in the foam molding which is obtained by this method. In the bead foam molding, however, the aforementioned expandable beads are charged in a mold and thereafter secondarily expanded and fused with each other to be formed, and hence fusion power between the beads is low. When a bending load is applied to the foam molding, therefore, separation and/or breakage are readily caused in the fusion interfaces between the beads, leading to insufficient bending strength.

Japanese Patent Laid-Open No. 4-16330 discloses a method of improving the bending strength of a foam molding which is obtained by the aforementioned bead expanding method. In the method disclosed in this prior art, expandable beads which are obtained by pre-expanding thermoplastic resins are compressively charged in a mold and thereafter degassing steam having a pressure which is higher by at least 0.2 kg/cm² than that in the mold is introduced into the mold for secondarily expanding/fusing the same, thereby improving fusion power between the beads. In the method described in this prior art, however, the foam molding obtained by forming is pressurized by the degassing steam. In order to prevent reduction of steam flows between the expandable beads resulting from excess compression, therefore, the pressure of the degassing steam cannot be much increased. Thus, the fusion power between the beads cannot be sufficiently increased, and hence it has been still difficult to obtain a foam molding having sufficient bending strength.

Also in the method described in the aforementioned prior art, in addition, two steps including that of pre-expanding the expandable beads and secondarily expanding and fusing the pre-expanded expandable beads in the mold must be executed, leading to a problem of low productivity.

OBJECTS OF THE INVENTION

A principal object of the present invention is to provide a thermoplastic resin foam which is light, excellent in bending strength, and excellent in balance between compressive strength and compression permanent strain, and a method of preparing the same.

Another object of the present invention is to provide a method of preparing a thermoplastic resin foam having homogeneous and fine cells therein.

DISCLOSURE OF THE INVENTION

According to a wide aspect of the present invention, provided is a foam which is characterized in that high expanded foams consisting of thermoplastic resins whose overall outer surfaces are covered with low-expanded-foam thin layers consisting of thermoplastic resins are thermally fused through the low-expanded-foam thin layers.

In the foam according to the present invention, expandable thermoplastic resin pellets or annular substances are expanded and thermally fused with each other, as described later. At this time, voids may be formed between the low-expanded-foam thin layers, or holes may be formed as the case may be. However, the sizes thereof are generally not more than 7 mm, preferably not more than 5 mm, more preferably less than 3.5 mm, depending on the expansion ratios of the low-expanded-foam thin layers and the high expanded foams, since homogeneity in thickness and shape holdability are inferior and various physical properties are also reduced if the same are oversized.

According to another wide aspect of the present invention, provided is a method of preparing a foam comprising a step of disseminating expandable thermoplastic resin pellets or annular substances containing a foaming agent, and a step of expanding the expandable thermoplastic resin pellets or annular substances by heating the same to a temperature exceeding the foaming temperature of the foaming agent which is contained in the expandable thermoplastic resins.

The method of preparing a foam and the foam according to the present invention are now described in order.

Thermoplastic Resin

In the method of preparing a foam according to the present invention, expandable thermoplastic resin pellets or annular substances containing a foaming agent are first disseminated. As to the thermoplastic resin forming the expandable thermoplastic resins containing a foaming agent, an arbitrary thermoplastic resin can be employed so far as the same is an expandable thermoplastic resin.

As to such an expandable thermoplastic resin, olefin-based resin such as low density polyethylene, high density polyethylene, linear low density polyethylene (it is hereinafter assumed that "polyethylene" includes low density polyethylene, high density polyethylene, linear low density polyethylene, or a mixture thereof), random polypropylene, homopolypropylene and block polypropylene (it is hereinafter assumed that "polypropylene" includes random polypropylene, homopolypropylene, block polypropylene with an extremely small amount, generally not more than 5 percent by weight, of ethylene, or a mixture thereof), polyvinyl chloride, chlorinated polyvinyl chloride, ABS resin, polystyrene, polycarbonate, polyamide, polyvinylidene fluoride, polyphenylene sulfide, polysulfone, polyether ether ketone and copolymers thereof can be listed, for example, and these thermoplastic resins may be employed independently, or two or more such materials may be combined with each other.

Among the aforementioned thermoplastic resins, the olefin-based resin such as polyethylene or polypropylene, or a mixture thereof is preferable in order to improve thermoformability of the obtained foam, and a mixture of high density polyethylene and homopolypropylene is particularly preferably employed, in particular.

It is necessary that the thermoplastic resins for forming the low-expanded-foam thin layers and the thermo-plastic resins for forming the aforementioned high expanded foams are the same type of resins.

Further, the aforementioned thermoplastic resins may be crosslinked at need. It is preferable to employ crosslinked thermoplastic resins since the expansion ratios are increased and hence the obtained foam can be lightened while thermostability can also be improved in this case.

If the degree of crosslinking of the aforementioned thermoplastic resins is high, the expansion ratios are reduced and thermoformability is reduced. When the degree of crosslinking of the thermoplastic resins is low, on the other hand, thermostability is reduced and cells are broken in expansion, and hence it is impossible to obtain homogeneous foaming cells. Therefore, the aforementioned degree of crosslinking is preferably 10 to 30 percent by weight in gel fraction serving as the index for the degree of crosslinking, and more preferably in the range of 10 to 20 percent by weight.

A method of crosslinking the aforementioned thermoplastic resins is not particularly restricted, but (1) a crosslinking method employing an electron beam, (2) a crosslinking method employing an organic peroxide, and (3) a method of melting and kneading silane modified thermoplastic resins in/with thermoplastic resins and thereafter carrying out a water treatment for crosslinking can be listed, for example. In particular, the crosslinking method (3) employing silane modified thermoplastic resins are preferably employed.

(1) The aforementioned method of crosslinking the thermoplastic resins by an organic peroxide is described.

The aforementioned organic peroxide is not particularly restricted but dibutyl peroxide, dicumyl peroxide, tertiary butylcumyl peroxide, diisopropyl peroxide etc. can be listed, for example, while dicumyl peroxide and tertiary butylcumyl peroxide are preferable, and dicumyl peroxide is preferable in particular.

The amount of the organic peroxide is preferably 0.5 to 5 parts by weight, more preferably 1 to 3 parts by weight, with respect to 100 parts by weight of the thermoplastic resins, since resin decomposition reaction progresses to color the obtained foam if the same is large while crosslinking of the thermoplastic resins is insufficient if the same is small.

(2) The aforementioned method of applying an electron beam for crosslinking the thermoplastic resins is described.

The amount of application of the electron beam is preferably 1 to 20 Mrad, and 3 to 10 Mrad is particularly preferable since the expansion ratio of the obtained foam is reduced due to excess application of crosslinking if the same is large while thermostability is reduced and foaming cells are so broken that homogeneous foaming cells cannot be obtained if the same is small.

The method of applying the electron beam is not particularly restricted, but a method of employing two electron beam generators for passing the thermoplastic resins therebetween thereby irradiating the thermoplastic resins with the electron beam can be listed, for example.

Then, (3) the crosslinking method employing a silane modified thermoplastic resin, which is most preferable, is described.

The aforementioned silane modified thermoplastic resins can be employed with no particular restriction so far as the same are employed in general. As to such silane modified thermoplastic resins, silane modified thermoplastic resins of polyethylene, silane modified thermoplastic resins of polypropylene, silane modified thermoplastic resins of an ethylene-vinyl acetate copolymer, and silane modified thermoplastic resins of polystyrene can be listed, for example. Due to high expandability, the silane modified thermoplastic resins of polyethylene, the silane modified thermoplastic resins of polypropylene and silane modified thermoplastic resins of polystyrene are preferable, while the silane modified thermoplastic resins of polyethylene and the silane modified thermoplastic resins of polypropylene are more preferable.

The silane modified thermoplastic resins are prepared by graft-modifying thermoplastic resins with an unsaturated silane compound, for example.

The aforementioned unsaturated silane compound indicates a compound which is expressed in a general formula $R^1SiR^2_m Y_{3-m}$.

In the formula, organic functional groups such as alkenyl groups such as a vinyl group, an allyl group, a propenyl group, a cyclohexenyl group etc.; a glycidyl group; an amino group, a methacryl group; and halogenized alkyl groups such as a γ-chloroethyl group and a γ-bromoethyl group can be listed as the aforementioned $R^1$.

In the formula, $R^2$ represents an aliphatic saturated hydrocarbon group or an aromatic hydrocarbon group, and a methyl group, an ethyl group, a propyl group, a decyl group or a phenyl group can be listed, for example.

Further, m represents 0, 1 or 2.

In the formula, Y represents a hydrolyzable organic group, and a methoxy group, an ethoxy group, a formyloxy group, an acetoxy group, a propionoxy group, an alkyl group or an arylamino group can be listed, for example, while Y may be identical to or different from each other when m is 0 or 1.

As to the aforementioned unsaturated silane compound, that expressed in a general formula $CH_2=CHSi(OA)_3$ is preferable. In the formula, A is a hydrocarbon group preferably having a carbon number of 1 to 8, more preferably 1 to 4, and vinyl trimethoxysilane, vinyl triethoxysilane, vinyl triacetoxysilane etc. can be listed as preferable unsaturated compounds, for example.

When the aforementioned silane modified thermoplastic resins have methoxy group, the methoxy group come into contact with water and hydrolyzed, to form hydroxyl group.

The hydroxyl group and hydroxyl group of other molecules react with each other to form Si—O—Si bonds, whereby silane modified thermoplastic resins are crosslinked with each other. At this time, a silane crosslinking catalyst is preferably employed.

The gel fraction of the silane modified thermoplastic resins after crosslinking is preferably in the range of 60 to 85 percent by weight since the crosslinking density is reduced to reduce expandability of the expandable thermoplastic resins if the same is reduced, and more preferably in the range of 70 to 80 percent by weight, in a viewpoint of improvement of expansion stability.

The gel fraction in the present invention indicates weight percentage of the residual weight of the resins after dipping in xylene of 120° C. for 24 hours to the weight of the resins before the xylene dipping.

The silane modified thermoplastic resins preferably have such a melt index that difference between the same and the melt index of the thermoplastic resins in and with which the silane modified thermoplastic resins are melted and kneaded is not more than 15 g/10 min.

This is because the silane modified thermoplastic resins cannot be homogeneously dissolved in the thermoplastic resins if the difference is greater than 1 g/10 min.

The amount of the silane modified thermoplastic resins is preferably in the range of 1 to 50 parts by weight, more preferably 5 to 40 parts by weight, and further preferably 10 to 30 parts by weight, with respect to 100 parts by weight of the thermoplastic resins, since crosslinking density is increased to reduce the expansion ratio of the obtained foam and deteriorate lightweightness if the amount is large while an expandable resin composition has no shear viscosity which is necessary for expansion in heat-expansion and expansion stability is reduced if the amount is too small.

In order to crosslink the thermoplastic resins by the silane modified thermoplastic resins, a silane crosslinking catalyst is employed at need.

The aforementioned silane crosslinking catalyst is not particularly restricted so far as the same facilitates crosslinking reaction between silane modified thermoplastic resins, and dibutyl tin diacetate, dibutyl tin dilaurate, dioctyl tin dilaurate, tin octanoate, tin oleate, lead octanoate, zinc 2-ethylhexanoate, cobalt octanoate, lead naphthenate, zinc caprylate, zinc stearate etc. can be listed, for example.

The amount of the aforementioned silane crosslinking catalyst is preferably in the range of 0.001 to 2.5 parts by weight, more preferably 0.01 to 2 parts by weight, further preferably 0.1 to 1.5 parts by weight with respect to 100 parts by weight of the thermoplastic resins since expandability of the expandable thermoplastic resins is reduced if the amount is increased, while the crosslinking reaction rate of the silane modified thermoplastic resins is reduced if the amount is reduced.

A method of adding the silane modified thermoplastic resins to the thermoplastic resins is not particularly restricted so far as the same is a method capable of homogeneously adding the resins, and a method of supplying thermo-plastic resins and silane modified thermoplastic resins to a single screw or twin screw extruder and then solvent-kneading the same, a method of solvent kneading with a roll, and a method of solvent kneading with a kneader can be listed, for example.

Methods of water treatments include a method of exposing the resins to water vapor in addition to a method of dipping the resins in the water, and in this case, the methods may be carried out under pressurization when the treatments are made at temperatures which are higher than 100° C.

The temperatures of the water and the water vapor for the water treatments are preferably 50 to 130° C., and 90 to 120° C. are particularly preferable since the crosslinking reaction rate is reduced if the temperatures are low while the expandable thermoplastic resin pellets or annular substances are fused with each other if the same are high.

The time for the water treatment is preferably 5 minutes to 12 hours since the crosslinking reaction may not completely progress if the time is short while the expandable thermoplastic resin pellets or annular substances are fused with each other if the same is long.

Foaming Agent

The aforementioned foaming agent is not particularly restricted so far as the same has a foaming temperature which is higher than the melting temperatures of the employed thermoplastic resins, and inorganic pyrolytic foaming agents such as sodium bicarbonate, ammonium carbonate, ammonium bicarbonate, an azido compound and sodium borohydride; and organic pyrolytic foaming agents such as azodicarbonamide, azobisisobutyronitrile, N,N'-dinitrosopentamethylenetetramine, P,P'-dinitrosopentamethylenetetramine, P,P'-oxybisbenzenesulfonylhydrazide, barium azodicarbonate and trihydrazinotriazine can be listed, for example, while azodicarbonamide which is excellent in sanitary is preferable due to simplicity in adjustment of the decomposition temperature and the decomposition rate and a large amount of gas generation. In the present invention, "foaming temperature" indicates the decomposition temperature of the decomposition type foaming agent.

The amount of the foaming agent is preferably 1 to 25 parts by weight, and more preferably assumed to be 5 to 15 parts by weight with respect to 100 parts by weight of the thermoplastic resins, since no homogeneous cells are formed due to cell breaking if the same is large while no expansion is attained if the same is small.

Preferred Example of Expandable Thermoplastic Resin

In the preparation method according to the present invention, expandable thermoplastic resin pellets or annular substances containing the aforementioned foaming agent are employed, while those prepared by blending two types of non-crosslinked thermoplastic resins which are hardly compatible with each other and a silane modified thermoplastic resin composition employing thermoplastic resins of the same type as one of the non-crosslinked thermoplastic resins are preferably employed as the aforementioned expandable thermoplastic resins. Since the resins contain the two types of non-crosslinked thermoplastic resins which are hardly compatible with each other, a island-sea structure described later is formed when the resins are crosslinked by the aforementioned silane modified thermoplastic resins.

When the resins contain the aforementioned two types of non-crosslinked thermoplastic resins which are hardly compatible with each other, they are preferably mixed with each other in the range of 3:7 to 7:3 in weight ratio, more preferably in the range of 4:6 to 6:4, and further preferably in the range of 5:5, in order to obtain a foam of a high expansion ratio having excellent surface smoothness in which one is homogeneously dispersed in the other.

When the difference between melt index of the aforementioned two types of non-crosslinked thermoplastic resins is increased, an extremely rough island-sea structure is formed and a foam of a high expansion ratio cannot be obtained. When the difference between the melt index is reduced, on the other hand, no homogeneous island-sea structure is formed and a foam of a high expansion ratio cannot be obtained. Therefore, the aforementioned difference between the melt indices is preferably in the range of 3 to 25 g/10 min. so that homogeneous bubble structures having fine grain sizes can be implemented, while 5 to 13 g/10 min. are more preferable and 7 to 11 g/10 min. are further preferable in order to attain a foam of a higher expansion ratio.

In the method of preparing a foam according to the present invention, more preferably, expandable thermoplastic resins in which 1 to 50 parts by weight of the aforementioned silane modified thermoplastic resins which are of the same type as one non-crosslinked thermoplastic resin of the two types of non-crosslinked thermoplastic resins, the aforementioned silane crosslinking catalyst and the aforementioned foaming agent are blended with 100 parts by weight of the thermoplastic resins containing the aforementioned two types of non-crosslinked thermoplastic resins are employed.

Since the aforementioned two types of non-crosslinked thermoplastic resins are hardly compatible each other, an extremely micro island-sea structure in which one non-crosslinked thermoplastic resin is homogeneously and finely dispersed in the other non-crosslinked thermoplastic resin is taken when the aforementioned expandable thermoplastic resin composition is blended by an extruder or the like.

Further, the silane modified thermoplastic resins employing the thermoplastic resins of the same type as the one non-crosslinked thermoplastic resin are preferentially dissolved in the one non-crosslinked thermoplastic resin since the thermoplastic resins are of the same types. In addition, the silane modified thermoplastic resins can be homogeneously diffused in the expandable resin composition whether the same are dissolved in the non-crosslinked thermoplastic resin forming the sea or those forming islands, since the two types of thermoplastic resins take the extremely micro island-sea structure.

When silane modified thermoplastic resins of the same type as the non-crosslinked thermoplastic resin forming the sea are employed so that the silane modified thermoplastic resins are preferentially dissolved in the non-crosslinked thermoplastic resin forming the sea, the silane modified thermoplastic resins are crosslinked with each other by performance of a water treatment so that a crosslinked structure is preferentially introduced into a continuous layer (sea part) and the sea which is the continuous layer extends in expansion, whereby the aforementioned expandable thermoplastic resins have melt viscosity which is suitable for expansion as a whole.

When silane modified thermoplastic resins of the same type as the non-crosslinked thermoplastic resins forming the islands are employed, the silane modified thermoplastic resins are preferentially dissolved in the non-crosslinked thermoplastic resin forming the islands, and a water treatment is performed so that the silane modified thermoplastic resins are crosslinked with each other and a crosslinked structure is preferentially introduced into non-continuous layers (island parts), on the other hand, it is assumed that the resins become suitable for expansion due to the following action, although the same is not clearly worked out.

The non-crosslinked thermoplastic resins forming the islands are homogeneously and finely dispersed and the grain sizes of the thermoplastic resins forming the islands are generally extremely small as compared with the diameters of gases generated by decomposition of the pyrolytic foaming agent while the spaces between the islands are extremely small as compared with the gas diameters, whereby the gases generated by decomposition of the foaming agent are substantially continuously enclosed with the non-crosslinked thermoplastic resins forming the islands in a macro view. Therefore, the gases are in states enclosed with layers having viscosity which is suitable for expansion and break no foams, whereby the expandable resin composition employed in the present invention attains melt viscosity which is suitable for expansion as a whole.

A foam which is obtained from the aforementioned expandable thermoplastic resins has portions partially having low crosslinking density, and hence the same is excellent in thermoformability since such portions have flowability in forming.

Further, the portions having low crosslinking density can be re-melted, while portions having high cross-linking density can be employed as a kind of fillers and are available for recycling.

On the other hand, it is possible to reduce the amount of the silane modified thermoplastic resins to not more than 50 parts by weight with respect to 100 parts by weight of the thermoplastic resin composition so that internal stress in forming resulting from crosslinking can be reduced, and a foam which is obtained by expanding this expandable resin composition is excellent in dimensional stability.

The melt viscosity of the composition forming the aforementioned expandable thermoplastic resin pellets or annular substances is assumed to be in the range of 5000 poise to 20000 poise at a temperature of 190° C. In the case of not more than 5000 poise, the viscosity is too much reduced and a foam of a high expansion ratio cannot be obtained since the same cannot withstand a foaming pressure in expansion and is easily foam-broken. In the case of at least 20000 poise, on the other hand, the viscosity is too much increased and a foam of a high expansion ratio cannot be obtained since a foaming pressure by foam gases generated by decomposition of the foaming agent is insufficient. The melt viscosity in this specification is a value measured in accordance with JIS K7199.

In addition, the gel fraction of the resins in the aforementioned expandable thermoplastic resins is set to be preferably 10 to 30 percent by weight, more preferably 10 to 20 percent by weight. If the same is lower than 10 percent by weight, thermostability is reduced, foaming cells are foam-broken in expansion, and homogeneous foam clearances cannot be obtained. When the gel fraction is higher than 30 percent by weight, on the other hand, the expansion ratio is reduced and thermoformability is also reduced due to excess progress of crosslinking.

Pellets or Annular Substances

A method of preparing the expandable thermoplastic resin pellets or annular substances which are employed in the present invention themselves is not particularly restricted but a method of supplying the thermoplastic resins, the pyrolytic foaming agent etc. forming the expandable thermoplastic resin pellets or annular substances (hereinafter "pellets or annular substances" are referred to as "granular materials") to an extruder, melting and kneading the same at a temperature which is lower than the decomposition temperature of the pyrolytic foaming agent, thereafter extruding the same in the form of a sheet and cooling the same, and cutting the same for preparing expandable thermoplastic resin granular materials, and (2) a method of supplying the thermoplastic resins, the pyrolytic foaming agent etc. to an extruder, melting and kneading the same at a temperature which is lower than the decomposition temperature of the pyrolytic foaming agent, thereafter extruding the same in the form of a strand and cooling the same, and cutting the same for preparing expandable thermoplastic resin pellets or annular substances can be listed, for example.

The shape of the expandable thermoplastic resin pellets or annular substances is not particularly restricted either but may be in the form of a hexagon, a circular cylinder or a spherical body, for example, while the hexagon is most preferable since the expandable thermoplastic resin granular materials will not roll when the same are disseminated.

When the expandable thermoplastic resin pellets or annular substances are in the form of hexagons, the length of one edge of each hexagon is not particularly restricted but preferably 0.1 mm to 50 mm, and particularly preferably 0.5 mm to 20 mm, since the ratio of low-expanded-foam thin layers is reduced in the prepared foam molding and bending strength is reduced if the same is too long while escape of foam gases is increased if the same is too short.

Dissemination

According to the present invention, the expandable thermoplastic resin pellets or annular substances which are prepared in the aforementioned manner are disseminated. This dissemination may be performed on a moved surface such as on a conveyor belt in a preparation apparatus shown in FIG. 1 described later, for example, or on a static surface.

Further, the expandable thermoplastic resin pellets or annular substances may be disseminated so that the pellets or annular substances will not overlap along the thickness direction, i.e., to form a single layer, or so that the expandable thermoplastic resin pellets or annular substances overlap with each other along the thickness direction.

As to preferable methods of disseminating the expandable thermoplastic resin pellets or annular substances so that the same will not overlap with each other along the thickness direction, (1) a method of disseminating a plurality of expandable thermoplastic resin granular materials in the form of rectangular parallelepipeds which are provided with minimum edges having substantially identical heights and bringing the same into a single layer by high frequency vibration while making the minimum edges along the thickness direction, (2) a method of disseminating a plurality of expandable thermoplastic granular materials in the form of cubes having substantially identical heights and bringing the same into a single layer by high frequency vibration, and (3) a method of bringing a plurality of expandable thermoplastic resin granular materials in the form of cubes having substantially identical heights which are disseminated in an overlapping manner into a single layer by a coater or the like can be preferably listed, for example, while a method of arranging respective expandable thermoplastic resin granular materials having substantially identical heights not to overlap with each other is also employed as the case may be.

The heights herein referred to indicate the heights of respective expandable thermoplastic resin granular materials which are directed when the expandable thermoplastic resin granular materials are disseminated.

In the aforementioned dissemination, the aforementioned pellets or annular substances are preferably so disseminated that downwardly projected areas of the expandable thermoplastic resin pellets or annular substances being disseminated occupy 10 to 75% of regions enclosed with outer edges of the regions where the pellets or annular substances are disseminated.

It is possible to ensure a deaeration space in expansion of the expandable resin granular materials by limiting the sum of the projected areas of the expandable resin granular materials after dissemination to 10 to 75% of sums of the projected area of the aforementioned regions, so that a foam having no voids can be prepared by expanding the respective expandable resin granular materials while repelling air from clearances therebetween. Further, the respective expandable resin granular materials can be fused/integrated with each other with no insufficient expansion spaces, whereby it is possible to prevent the foam as prepared from formation of holes.

In addition, it is possible to obtain a foam attaining compatibility of bending strength and flexibility by limiting the sum of the projected areas of the expandable thermoplastic resin pellets or annular substances after dissemination to 10 to 75% of the total projected area of the aforementioned regions thereby limiting the ranges of the expansion ratios and the thicknesses of the low-expanded-foam thin layers.

Expansion Forming

According to the inventive preparation method, the aforementioned pellets or annular substances are disseminated and thereafter the pellets or annular substances are heated to a temperature exceeding the foaming temperature of the foaming agent which is contained in the aforementioned expandable thermoplastic resins, so that the pellets or annular substances are expanded.

When the expandable thermoplastic resin pellets or annular substances are expanded by heating, surfaces and the interiors of the respective pellets or annular substances become low-expanded-foam-resin thin layers and high expanded foams while the low-expanded-foam-resin thin layers of the surfaces are fused to be integrated with each other while being expanded, whereby it is possible to obtain a thin layer molding in which thermoplastic resin high expanded foams covered with the aforementioned thermoplastic resin low-expanded-foam thin layers on the overall outer surfaces are thermally fused with each other through the low-expanded-foam thin layers.

The inventive preparation method, which can obtain a foam by an extremely simple method of disseminating expandable thermoplastic resin granular materials and heating and expanding to fuse the same, is a preparation method having excellent productivity which can omit a step of pre-expanding the expandable thermoplastic resin pellets or annular substances.

The aforementioned heating method is not particularly restricted but arbitrary heating means can be employed so far as the same can heat the granular materials to a temperature exceeding the foaming temperature of the foaming agent. For example, it is possible to heat the granular materials by employing an electric heater, a far infrared ray heater, a heating apparatus formed by circulating a heating medium such as heated oil or air or the like.

Further, a method of heating and expanding to fuse the expandable thermoplastic resin pellets or annular substances while restricting thicknesses thereof is not particularly restricted either. For example, it is possible to disseminate the aforementioned expandable thermoplastic resin pellets or annular substances between two plate bodies for expanding the same while keeping the space between the plate bodies constant. Alternatively, it is also possible to disseminate the expandable thermoplastic resin pellets or annular substances, thereafter hold the same between two plate bodies, and thereafter expand the same while increasing the space between the plate bodies up to a certain size. Further, it is also possible to disseminate the expandable thermoplastic resin pellets or annular substances, thereafter hold the same between two plate bodies, and thereafter increase the space between the plate bodies on both sides through expansion pressures in expansion of the expandable thermoplastic resin pellets or annular substances.

Arbitrary plate members such as iron plates, steel plates or tetrafluoroethylene belts, for example, can be employed as the aforementioned plate bodies.

Further, it is preferable to arrange composite sheets which are thermoplastic resin sheets which are reinforced with fiber, for example, between the aforementioned plate bodies and the expandable thermoplastic resin pellets or annular substances. In this case, the aforementioned thermoplastic resin sheet-type substance may be arranged between the plate body and the expandable thermoplastic resin pellets or annular substances only on one side thereof.

When the aforementioned composite sheet is employed, the aforementioned expandable thermoplastic resin pellets or annular substances are preferably previously disseminated on the composite sheet so that the composite sheet is integrated with the obtained foam. In this method, a second composite sheet is superposed on the disseminated expandable thermoplastic resin pellets or annular substances, to obtain a laminate. Then, this laminate is heated to a temperature exceeding the foaming temperature of the foaming agent, so that the expandable thermoplastic resin pellets or annular substances are expanded and a foam in which the composite sheets are integrated with the foam is obtained.

In the foam which is integrally formed with the thermoplastic resin sheet type substance on at least one surface as hereinabove described, the bending strength of the overall foam is effectively improved by the thermoplastic resin sheet type substance.

In addition to the aforementioned composite sheet, various materials such as glass paper and a chopped strand mat (these are generically called as "reinforcing sheet") can be employed.

If the weight of glass fiber which is employed for the glass paper and the chopped strand mat is heavy, however, it is impossible to attain weight reduction of the obtained foam. If the weight of the glass fiber is light, on the other hand, it is impossible to attain improvement in strength of the obtained foam. Therefore, preferably that of 10 to 500 g/m$^2$, more preferably that of 50 to 300 g/m$^2$, is employed as the aforementioned glass fiber.

Further, the thermoplastic resin which is employed for the aforementioned composite sheet is not particularly restricted either, but polyethylene, polypropylene, polyethylene terephthalate etc. can be listed, for example. In order to improve adhesion between the composite sheet and the foam part, further, a composite sheet employing a thermoplastic resin of the same type as the thermoplastic resins employed for the foam is preferably employed.

As the fiber which is employed for the composite sheet, further, inorganic fiber such as carbon fiber, organic fiber such as aramid fiber or nylon fiber, metal fiber etc., for example, can be listed in addition to the glass fiber, and either woven fabric or nonwoven fabric of such fiber is available.

It is impossible to attain weight reduction of the obtained foam if the thickness of the aforementioned reinforcing sheet is large, while reinforcement and strengthening are insufficient if the same is small. Therefore, the thickness of the composite sheet is assumed to be preferably 0.05 to 1 mm, more preferably 0.1 to 0.5 mm.

In order to obtain a foam by the inventive preparation method with employment of the expandable thermoplastic resin which is a preferable example prepared by blending the aforementioned silane modified thermoplastic resins, the silane modified thermoplastic resins are crosslinked with each other by a water treatment and thereafter heated to a level exceeding the foaming temperature of the foaming agent, whereby the foam is obtained.

A reinforcing material such as glass short fiber, carbon short fiber or polyester short fiber, and a filler such as calcium carbonate, aluminum hydroxide or glass powder may be added to the thermoplastic resin employed for the aforementioned expandable thermoplastic resins at need, in order to improve the bending strength of the foam.

When short fiber is added as the reinforcing material, 1 to 20 parts by weight is preferable and 3 to 10 parts by weight is particularly preferable with respect to 100 parts by weight of the thermoplastic resin, since cells are broken in expansion and a high expansion ratio cannot be attained if the amount is large, while no effect of reinforcing the strength of the obtained foam is attained if the same is small.

The length of the short fiber is preferably 1 to 20 mm, and particularly preferably 3 to 5 mm since weight reduction of the obtained foam cannot be attained if the same is large while no effect of reinforcing the strength of the obtained foam is attained if the same is small.

When a filler is added, 10 to 100 parts by weight is preferable and 30 to 50 parts by weight is particularly preferable with respect to 100 parts by weight of the thermoplastic resin, since weight reduction of the obtained foam cannot be attained if the same is much while no effect of reinforcing strength of the obtained foam is attained if the same is less.

Foam

The foam according to the present invention is a thin layer molding in which thermoplastic resin high expanded foams whose overall outer surfaces are covered with low-expanded-foam thin layers consisting of thermoplastic resins are thermally fused with each other through the low-expanded-foam thin layers.

Since the high expanded foams are thermally fused with each other through the low-expanded-foam thin layers, the respective low-expanded-foam thin layers provide compressive strength and the high expanded foams provide flexibility, while high heat insulation performance is also provided since the low-expanded-foam thin layers are expanded. Further, the high expanded foams whose overall outer surfaces are covered with the respective low-expanded-foam thin layers forming the foam are thermally fused to be strongly integrated with each other through the low-expanded-foam thin layers by the foaming pressure in expansion, whereby the same are not separated and/or broken in thermal fusion interfaces and are excellent in flexibility while having high bending strength.

The aforementioned proper thermoplastic resins can be employed as the thermoplastic resins forming the aforementioned high expanded foams and low-expanded-foam thin layers, and it is possible to obtain the inventive foam by employing the expandable thermoplastic resin which is prepared by mixing a foaming agent and other arbitrary components with the thermoplastic resins.

The high expanded foams whose overall outer surfaces are covered with the low-expanded-foam thin layers may be formed as a single layer not to overlap with each other along the thickness direction, and in this case, the high expanded foams are thermally fused with each other through the low-expanded-foam thin layers along the transverse directions, i.e., in the longitudinal direction and the cross direction. In addition to the aforementioned flexibility of the foam, therefore, the foam enters a pseudotruss structure and the bending strength is further increased since the low-expanded-foam thin layers extend along the thickness direction of the foam and the low-expanded-foam thin layers are homogeneously formed along the thickness direction.

On the other hand, the foam may have a multilayer structure in which the high expanded foams are stacked in plural along the thickness direction, and in this case, the foam is not separated and/or broken in the fusion interfaces when a bending load is applied to the foam. Therefore, it is possible to obtain a foam which is excellent in flexibility.

When the thermoplastic resin has preferentially crosslinked portions having high crosslinking density and hardly crosslinked portions having low crosslinking density and these have island-sea structures, the portions having low crosslinking density have flowability in forming, where by the foam is excellent in thermoformability.

When the expansion ratios of the aforementioned low-expanded-foam thin layers are low, flexibility of the foam is reduced while heat conductivity is increased. If the expansion ratios of the low-expanded-foam thin layers are high, on the other hand, a foam having high bending strength cannot be obtained. Therefore, the expansion ratios of the low-expanded-foam thin layers are preferably 1.1 to 10 times, more preferably 1.2 to 7 times, and particularly preferably 1.2 to 5 times.

Weight reduction of the foam cannot be attained if the low-expanded-foam thin layers are thick, while a foam having high bending strength cannot be obtained if the same are thin. Therefore, the low-expanded-foam thin layers are preferably 30 $\mu$m to 500 $\mu$m, more preferably 40 $\mu$m to 400 $\mu$m, and particularly preferably 50 $\mu$m to 400 $\mu$m.

The thicknesses of the low-expanded-foam thin layers may not be homogeneous, but may be heterogeneous.

The thicknesses of the low-expanded-foam thin layers herein referred to indicate average thicknesses of the low-expanded-foam thin layers along the cross-sectional direction of the foam.

According to the present invention, the expansion ratios and the thicknesses of the aforementioned low-expanded-foam thin layers are preferably 1.1 to 10 times and 30 $\mu$m to 500 $\mu$m since weight reduction and bending strength of the foam are compatible, more preferably 1.2 times to 7 times and 40 $\mu$m to 400 $\mu$m, and particularly preferably 1.2 times to 5 times and 50 $\mu$m to 400 $\mu$m.

If the expansion ratios of the high expanded foams are low, it is difficult to attain weight reduction and the heat conductivity of the foam is increased to reduce the heat insulation property of the obtained foam, while a foam having high bending strength cannot be obtained if the same are high. Therefore, the expansion ratios of the high expanded foams are preferably 20 to 50 times, more preferably 5 to 50 times, particularly preferably 10 to 35 times.

If the sizes of the high expanded foams are large, the bending strength of the obtained foam is reduced, while surface smoothness of the obtained foam is reduced if the same are small. Therefore, the sizes of the high expanded foams are preferably 5 to 10 mm, and particularly preferably 7 to 50 mm.

The sizes of the high expanded foams may not be homogeneous, but may be heterogeneous.

The sizes of the high expanded foams herein referred to indicate the maximum values among dimensions of respective directions in cross sections.

The foam according to the present invention consists of such a structure that the high expanded foams are thermally fused with each other through the low-expanded-foam thin layers, and the same is generally in the form of a sheet.

In the foam according to the present invention, a composite sheet consisting of the aforementioned reinforcing fiber and the thermoplastic resin may be stacked at least on its one surface, whereby it is possible to further improve bending strength.

A method of preparing the "foam" according to the present invention is not particularly restricted to the aforementioned inventive preparation method, but (1) a method of disseminating expandable thermoplastic resin granular materials, heating, expanding and thermally fusing the same for preparing a foam can be preferably listed, while it is also possible to employ (2) a method of previously preparing a thermoplastic granular foams and stacking the same by thermal fusion for preparing a foam, as the case may be.

Effect of the Invention

In the inventive foam, as hereinabove described, the thermoplastic resin high expanded foams whose overall outer surfaces are covered with the thermoplastic resin low-expanded-foam thin layers are thermally fused with each other through the aforementioned low-expanded-foam thin layers. The low-expanded-foam thin layers can improve compressive strength of the foam while providing high heat insulation performance due to low expanded foaming. In addition, the low-expanded-foam thin layers strongly fuse to integrate the respective high foams with each other, whereby the same also provide sufficient flexibility which cannot be attained in a foam obtained by a conventional bead expansion forming.

According to the inventive method of preparing the aforementioned foam, further, it is possible to readily prepare a foam having the aforementioned excellent effects with high productivity.

According to a preferred aspect of the present invention, further, an expandable resin composition having melt viscosity which is in the range of 3000 poise to 20000 poise at 190° C. is employed, whereby expansion stability is further improved and hence it is possible to provide a foam of high expansion having a homogeneous bubble structure and excellent bending strength.

(1) When the gel fraction of the resins in the expandable thermoplastic resins is made 10 to 30 percent by weight, proper crosslinking is applied to the resins and it is possible to provide a foam which is balanced in formability and thermostability.

(2) When expandable thermoplastic resins containing specific silane modified thermoplastic resins, a silane crosslinking catalyst and a foaming agent in those mixed with a prescribed amount of specific non-crosslinked thermoplastic resins are employed, portions having low crosslinking density are provided and hence such portions have flowability in forming and are excellent in thermoforming, and it is possible to obtain homogeneous and delicate foaming cells which are excellent in thermostability since crosslinking is properly applied as a whole and having proper melt viscosity, while the bending strength of the obtained foam also becomes excellent.

According to the present invention, therefore, it is possible to provide a foam which is suitable for various heat insulators including a roof insulator and a floor insulator, a cushioning material and various interior materials including a vehicle interior material.

BEST MODE FOR CARRYING OUT THE INVENTION

Figure 1:
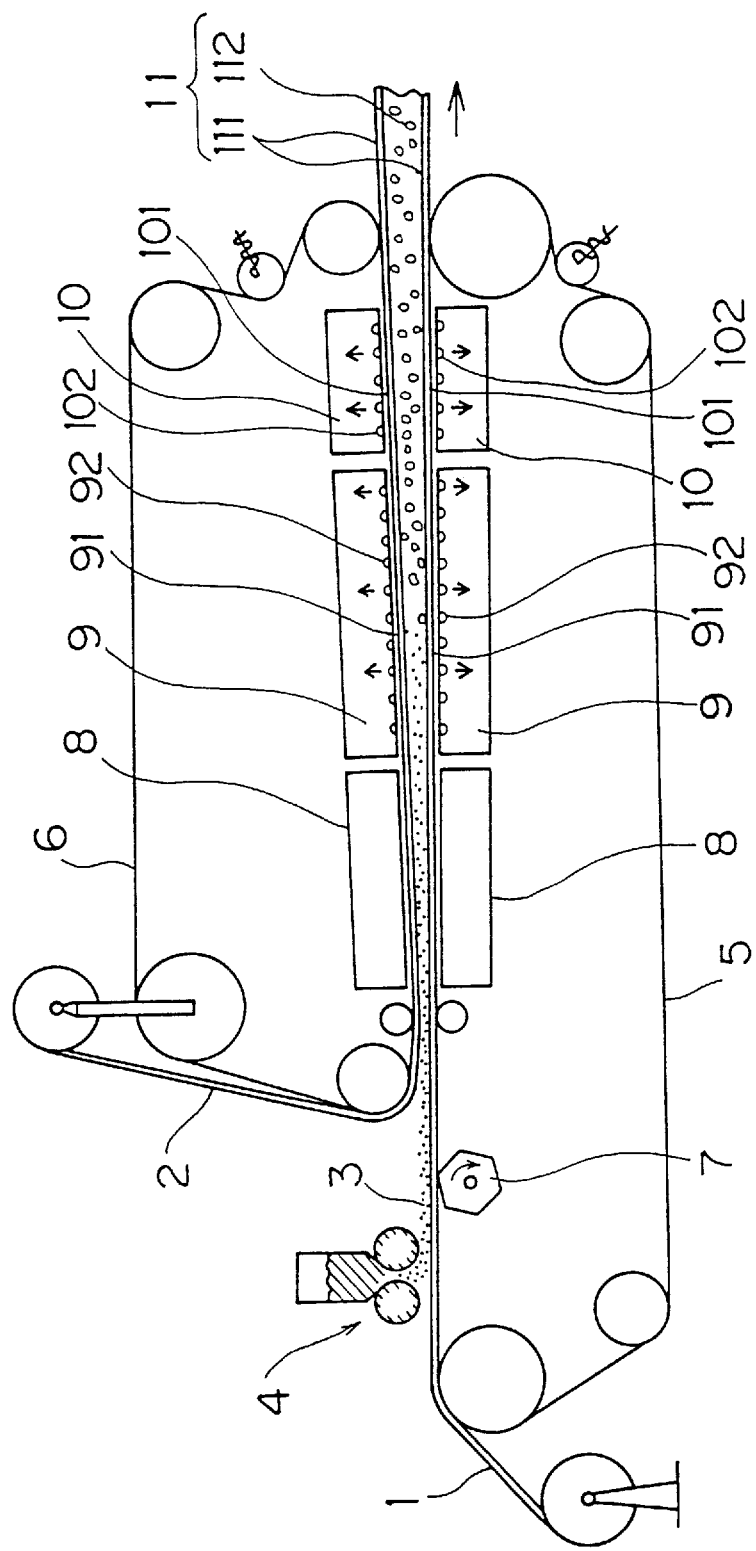
FIG. 1 is a front elevational view showing an example of an apparatus which is employed for a method of preparing a foam according to the present invention.

FIG. 1 is a front elevational view of an apparatus example which is employed for a method of preparing a foam according to the present invention, and 1 and 2 denote reinforcing sheets, 3 denotes thermoplastic resin pellets or annular substances containing a foaming agent, 5 and 6 denote conveyor belts, 9 and 9 denote heating apparatuses, 10 and 10 denote cooling apparatuses, and 11 denotes a foam.

The reinforcing sheet 1 is fed to the conveyor belt 5, so that the expandable thermoplastic resin pellets or annular substances 3 are disseminated on the reinforcing sheet 1 by a pellet or annular substance disseminator 4 which is provided halfway the same. Then, the reinforcing sheet 2 is fed to the conveyor belt 6 and superposed on the pellets or annular substances 3, so that the same is successively fed to preheating apparatuses 8 and 8, the heating apparatuses 9 and 9 and the cooling apparatuses 10 and 10. 7 denotes a vibration apparatus, which vibrates the reinforcing sheet 1 for homogenizing the disseminated expandable thermoplastic resin pellets or annular substances 3.

The expandable thermoplastic resin pellets or annular substances 3 are preheated in the preheating apparatuses 8 and 8 and heated in the heating apparatuses 9 and 9 to a level exceeding the foaming temperature of the foaming agent, so that the foaming agent is decomposed and the thermoplastic resin pellets or annular substances 3 are melted/expanded and the resin pellets or annular substances are fused with each other and fused on surfaces of the reinforcing sheets 1 and 2.

The heating temperature in the heating apparatuses 9 and 9 is generally assumed to be at least the foaming temperature of the foaming agent and not more than the foaming temperature +20° C., such as about 200° C., for example.

The expanded and fused superposed sheets are cooled in the cooling apparatuses (the cooling temperature is about 30° C., for example) 10 and 10, to be suppressed in expansion and adjusted to prescribed thicknesses.

In the aforementioned heating apparatuses 9 and 9 and the cooling apparatuses 10 and 10, it is preferable to provide plural vacuum suction grooves 92 and 92 and 102 and 102 on heating surfaces 91 and 91 and cooling surfaces 101 and 101 thereof so that homogeneity of thicknesses and surface smoothness can be retained.

Thus, the foam 11 consisting of a foam layer 112 formed by expansion of the thermoplastic resin pellets or annular substances 3 and reinforcing sheet layers formed to be integrally fused on both surfaces thereof is obtained.

Figure 2:
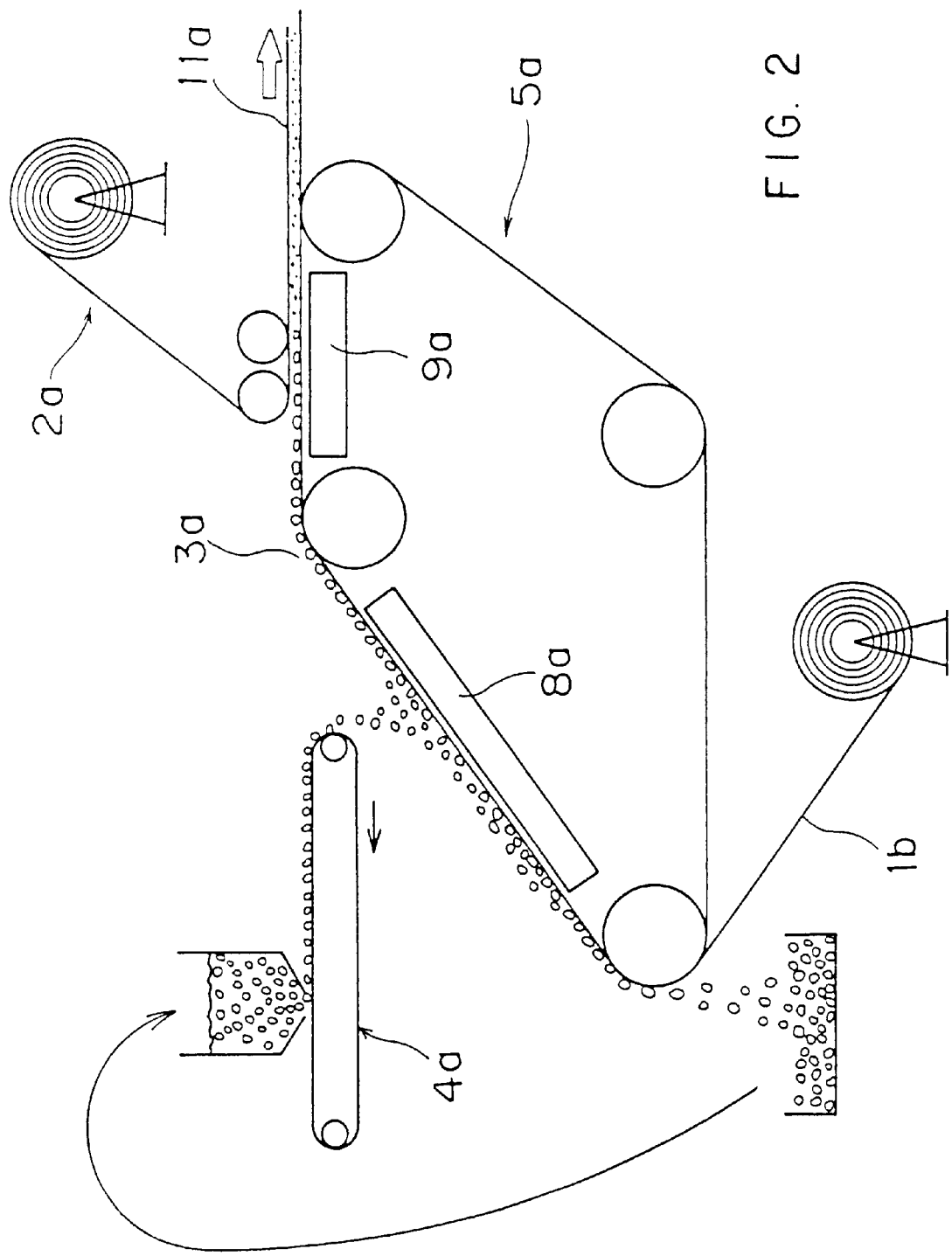
FIG. 2 is a front elevational view showing another example of an apparatus which is employed for the method of preparing a foam according to the present invention.

FIG. 2 shows an apparatus of another example for carrying out the method of preparing a foam according to the present invention. Here, a reinforcing sheet 1b is fed onto a conveyor belt 5a. On an inclined portion of this reinforcing sheet 1b, expandable thermoplastic resin pellets or annular substances 3a are disseminated from a pellet disseminator 4a. In the inclined surface portion of the aforementioned thermoplastic resin sheet 1b, a hot platen 8a which is heated to a temperature of 200° C. to 210° C. is provided. Therefore, the surface of the reinforcing sheet 1b is brought into a melted state, whereby the expandable thermoplastic resin pellets 3a adhere to the reinforcing sheet 1b, and excess pellets are downwardly dropped. Thus, the dropped pellets can be used again.

Then, a second reinforcing sheet 2a is superposed on the adhering thermoplastic resin pellets 3a, so that the expandable thermoplastic resin pellets or annular substances 3a are heated and expanded by the hot platen 9a which is heated to the temperature of about 200° C. Thus, a molding 11a is obtained.

Concrete Examples of the method of preparing a foam and the foam according to the present invention are now described.

Preparation of Expandable Thermoplastic Resin Granular Materials

High density polyethylene (by Mitsubishi Petrochemical Co., Ltd., trade name: EY40H, melt index (hereinafter referred to as MI); 1.5 g/10 min.), polypropylene (1) (by Mitsubishi Petrochemical Co., Ltd., trade name: MA3, MI; 11 g/10 min.), polypropylene (2) (by Mitsubishi Petrochemical Co., Ltd., trade name: MH 8, MI; 0.3 g/10 min.), polypropylene (3) (by Mitsubishi Petrochemical Co., Ltd., trade name: MA2A, MI; 25 g/10 min.) and silane modified polypropylene (by Mitsubishi Petrochemical Co., Ltd., trade name: LINKLON XPM800HM, MI; 11 g/10 min., gel fraction after crosslinking 80 percent by weight) were weighed in the rates shown in the following Tables 1 to 3, further mixed with 0.1 part by weight of dibutyl tin dilaurate serving as a crosslinking catalyst and 5 parts by weight of azodicarbonamide (by Otsuka Chemical Co., Ltd., trade name: SO-20, foaming temperature=210° C.), thereafter supplied to a biaxial extruder of 30 mm in diameter, melted/kneaded at a temperature of 180° C., and extruded in the form of sheets having thicknesses shown in Tables 1 to 3 and widths of 300 mm. Thereafter the sheets were cooled and cut into dimensions of 5 mm in width by 5 mm in length, dipped in water of 98° C. for 2 hours and thereafter dried, thereby obtaining expandable thermoplastic resin granular materials A.

EXAMPLES 1, 3, 5, 9, 11, 13, 15, 17, 19, 21 AND 23

The expandable thermoplastic resin granular materials A obtained in the aforementioned manner were employed and the preparation apparatus shown in FIG. 1 was utilized to obtain foams. In the preparation apparatus shown in FIG. 1, however, the thermoplastic resin sheet substances 1 and 2 were not employed but the aforementioned expandable thermoplastic resin granular materials A were directly disseminated on the conveyor belt 5. This dissemination was so carried out that the rates (dissemination projected area ratios) of sums of downwardly projected areas of portions where the expandable thermoplastic resin granular materials A were actually disseminated to total projected areas of portions enclosed with outer edges of the regions where the expandable thermoplastic resin granular materials were disseminated reached the ratios shown in Tables 1 to 3 and became double layers. The heating temperature for the expandable thermoplastic resin granular materials A by the heating apparatuses 9 and 9 was assumed to be 210° C., and the granular materials were to expanded by heating for 10 minutes and thereafter cooled in the cooling apparatuses 10 and 10 for 10 minutes, to obtain foams of 5 mm in thickness.

Expansion ratios of the obtained foams, thicknesses of low-expanded-foam thin layers, low-expanded-foam thin layer expansion ratios, high expanded foam expansion ratios, states of the foams, foam clearance states, bending strength values, 25% compressive strength values, compression permanent strain, thermoformability levels and thermostability levels were measured in the following methods. These results are also shown in Tables 1 to 3.

(Expansion Ratio)

Measured in accordance with JIS K6767.

(Low-expanded-foam thin layer Thickness)

Sections of the formed foams were observed and measured with a microscope provided with a scale.

(Low-expanded-foam thin layer Expansion Ratio)

The low-expanded-foam thin layers were cut out from the foams, and measured in accordance with JIS K6767.

(High Expanded Foam Expansion Ratio)

The high expanded foams were cut out from the foams, and measured in accordance with JIS K6767.

(State of Foam)

Surfaces and sections of the foams were observed.

(Foam Clearance State)

Sections of the foams were observed with a microscope provided with a scale to measure maximum inner diameter values of clearances such as voids and holes and foaming cells etc., for making four-stage evaluation with the following reference as foam clearance states.

⊚: The maximum inner diameter value of foaming cells was less than 2 mm, and clearances were substantially absent.

○: The maximum inner diameter value of clearances was less than 3.5 mm.

Δ: The maximum inner diameter value of clearances was at least 3.5 mm and less than 7 mm.

X: The maximum inner diameter of clearances was at least 7 mm.

(Bending Strength)

The foams were cut into 50 mm by 150 mm by 50 mm, and a three-point bending test was made with application of bending loads under conditions of a spun of 100 mm, a pressing speed of 50 mm/min., R of a pressing shaft=5 and n=5, to measure bending strength values.

(Broken Portion)

Broken portions upon application of the aforementioned bending loads were visually observed.

(25% Compressive Strength)

Measured in accordance with JIS K6767.

(Compression permanent strain)

Measured in accordance with JIS K6767.

(Thermoformability)

Respective opening portions of several types of bottomed cylindrical bodies having opening end portions R=5, diameters=70 mm and prescribed depths were covered with foams of 20 mm by 20 mm by 5 mm which were heated to 180° C., then the heated foams were forced into opening concave portions with a cylindrical member of 70 mm in diameter, depths h (mm) of the foams which were forced into the opening concave portions were measured when the foams started to be broken, drawing ratios were obtained by the following equation, and thereafter five-stage evaluation was carried out with the following reference as thermoformability:

Drawing Ratio (%)=(h/80)×100

Thermoformability;

drawing ratio of at least 75% . . . 5 drawing ratio of at least 60% and less than 75% . . . 4 drawing ratio of at least 50% and less than 60% . . . 3 drawing ratio of at least 30% and less than 50% . . . 2 drawing ratio of not more than 30% . . . 1

(Thermostability)

The foams were cut into 20 mm by 20 mm by 5 mm, allowed to stand under a 210° C. atmosphere for 5 minutes and thereafter cooled at 23° C., and volumes V (mm$^3$) were measured with an underwater substitution densimeter to obtain volume changes (%) through the following equation, and thereafter four-stage evaluation was made with the following reference as thermostablity:

Volume Change (%)={(2000−V)}/2000×100

Thermostability;

volume change of not more than 20% . . . ⊚ volume change of at least 20% and less than 30% . . . ○ volume change of at least 30% and less than 50% . . . Δ volume change of at least 50% . . . X

EXAMPLES 2, 4, 6, 10, 12, 14, 16, 18, 20, 22 AND 24

The expandable thermoplastic resin granular materials A obtained in the aforementioned manner were disseminated as shown in Tables 1 to 3 not to overlap with each other in the thickness directions, to obtain foams through the preparation apparatus shown in FIG. 1 similarly to Example 1. However, the temperature for heating the thermoplastic resin granular materials A by the heating apparatuses 9 and 9 was assumed to be 210° C., and the granular materials were heated for 10 minutes, expanded, thereafter transferred to the cooling apparatuses 10 and 10 which were set at 30° C. and cooled for 10 minutes, to obtain foams of 10 mm in thickness.

As to the obtained foams, respective characteristics were measured similarly to Example 1, and the results were shown in the following Tables 1 to 3.

EXAMPLE 7

The expandable thermoplastic resin granular materials A obtained in the aforementioned manner were employed and the preparation apparatus shown in FIG. 1 was employed to obtain a foam. In Example 7, a composite sheet being a high density polyethylene (by Mitsubishi Petrochemical Co., Ltd., trade name: JX10, MI; 20 g/10 min.) 90 g/m2 sheet reinforced with glass paper (by ORIBEST, trade name: FVP-045) 45/m2 was employed as the reinforcing sheet 1 on the conveyor belt 5 of the preparation apparatus shown in FIG. 1. The aforementioned expandable thermoplastic resin granular materials A were disseminated on this composite sheet to attain the dissemination projected area ratio shown in Table 1 and a multilayer.

Thereafter a sheet consisting of the same material as the aforementioned composite sheet was employed as the reinforcing sheet 2 shown in FIG. 1, to expand and form the expandable thermoplastic resin granular materials A between the composite sheets. In this case, the heating temperature by the heating apparatuses 9 and 9 was assumed to be 210° C., and the materials were expanded by heating for 10 minutes, thereafter transferred to the cooling apparatuses 10 and 10 which were set at 30° C. and cooled for 10 minutes, thereby obtaining a foam of 10 mm in thickness.

As to the obtained foam, respective characteristics were measured similarly to Example 1. The results are also shown in the following Table 1.

EXAMPLE 8

A foam was obtained similarly to Example 7. In Example 8, however, dissemination of the expandable thermoplastic resin granular materials onto a fiber-reinforced thermoplastic resin sheet was in a rate shown in Table 1, while the expandable thermoplastic resin granular materials were disseminated not to overlap with each other along the thickness direction. Forming was carried out similarly to Example 7 as to other points, to obtain a foam of 10 mm in thickness.

Characteristics of the obtained foam were measured similarly to Example 1. The results are also shown in Table 1.

COMPARATIVE EXAMPLE 1

The expandable thermoplastic resin granular materials A obtained in the aforementioned manner were expanded by heating in a gear oven of 210° C. for 10 minutes and thereafter air-cooled, to obtain foaming granular materials. The foaming granular materials were charged in a mold having inner dimensions of 10 mm by 200 mm by 200 mm, heated and fused with a hand press of 170° C. for 5 minutes, thereafter transferred to a cooling apparatus which was set at 30° C. and cooled for 10 minutes, to obtain a foam of 10 mm in thickness.

Characteristics of the obtained foam were measured similarly to Example 1. The results are also shown in the following Table 1.

TABLE 1

| | | Example | | | | | | | |
|---|---|---|---|---|---|---|---|---|---|
| | | 1 | 2 | 3 | 4 | 5 | 6 | 7 | 8 |
| Resin Compounding Ratio | HDPE | | | | | | | | |
| | PP1 | 100 | 100 | 100 | 100 | 100 | 100 | 100 | 100 |
| | PP2 | | | | | | | | |
| | PP3 | | | | | | | | |
| | Silane Crosslinking PP | 80 | 80 | 80 | 80 | 80 | 80 | 80 | 80 |
| Crosslinking Resin Granular Materials | Viscosity after Croslinking (poise) | 21000 | 21000 | 21000 | 21000 | 21000 | 21000 | 21000 | 21000 |
| | Gel Fraction (wt. %) | 36 | 36 | 36 | 36 | 36 | 36 | 36 | 36 |
| | Pellet Thickness (mm) | 1.2 | 1.2 | 3 | 3 | 2 | 2 | 2 | 2 |
| | Dissemination Projected Area Ratio (%) | 34.7 | 41.7 | 13.9 | 16.7 | 20.8 | 25.0 | 20.8 | 25.0 |
| | Dissemination State | Multi-layer | Single Layer | Multi-layer | Single Layer | Multi-layer | Single Layer | Multi-layer | Single Layer |
| Foam | Low Expanded Thin Film Thickness (μm) | 540 | 650 | 17 | 20 | 125 | 150 | 125 | 150 |
| | Low Expanded Thin Film Expansion Ratio (times) | 1.05 | 1.05 | 17 | 14 | 4 | 3.5 | 4 | 3.5 |
| | High Expanded Foam Expansion Ratio (times) | 38 | 40 | 23 | 23 | 28 | 32 | 28 | 32 |
| | Presence/Absence of Composite Sheet | Absent | Absent | Absent | Absent | Absent | Absent | Present | Present |
| | State of Foam | Excellent | Excellent | Excellent | Excellent | Excellent | Excellent | Excellent | Excellent |
| | Foam Clearance State (4 stages) | ○ | ○ | ○ | ○ | ○ | ○ | ○ | ○ |
| Foam Physical Property | Bending Strength (kg/cm$^2$) | 0.20 | 0.22 | 0.20 | 0.21 | 0.27 | 0.29 | 0.51 | 0.57 |
| | Broken Portion | Foam | Foam | Foam | Foam | Foam | Foam | Foam | Foam |
| | 25% Compressive Strength (kgf/cm$^2$) | 0.39 | 1.12 | 0.65 | 0.78 | 1.18 | 1.28 | 1.12 | 1.35 |
| | Compression Permanent Strain (%) | 8.8 | 8.2 | 5.5 | 5.1 | 6.5 | 6.1 | 7.5 | 7.3 |
| | Thermoformability (5-stage Evaluation) | 2 | 2 | 2 | 2 | 2 | 2 | 2 | 2 |
| | Thermostability (3-stage Evaluation) | ○ | ○ | ○ | ○ | ○ | ○ | ○ | ○ |

TABLE 2

| | | Example | | | | | | | |
|---|---|---|---|---|---|---|---|---|---|
| | | 9 | 10 | 11 | 12 | 13 | 14 | 15 | 16 |
| Resin Compounding Ratio | HDPE | | | | | | | | |
| | PP1 | 100 | 100 | 100 | 100 | | | 100 | 100 |
| | PP2 | | | | | | | | |
| | PP3 | | | | | 100 | 100 | | |
| | Silane Crosslinking PP | 80 | 80 | 80 | 80 | 5 | 5 | 80 | 80 |
| Crosslinking Resin Granular Materials | Viscosity after Croslinking (poise) | 21000 | 21000 | 21000 | 21500 | 24500 | 4500 | 18000 | 18000 |
| | Gel Fraction (wt. %) | 36 | 36 | 36 | 36 | 4 | 4 | 36 | 36 |
| | Pellet Thickness (mm) | 0.55 | 0.55 | 10 | 10 | 2 | 2 | 2 | 2 |
| | Dissemination Projected Area Ratio (%) | 76.7 | 90.9 | 4.2 | 5.0 | 20.8 | 25.0 | 20.8 | 25.0 |
| | Dissemination State | Multi-layer | Single Layer | Multi-layer | Single Layer | Multi-layer | Single Layer | Multi-layer | Single Layer |
| Foam | Low Expanded Thin Film Thickness (μm) | 580 | 700 | 7 | 8 | 125 | 150 | 125 | 150 |
| | Low Expanded Thin Film Expansion Ratio (times) | 1.05 | 1.05 | 18 | 15 | 4 | 3.5 | 4 | 3.5 |
| | High Expanded Foam Expansion Ratio (times) | 33 | 35 | 25 | 28 | 28 | 32 | 28 | 32 |
| | Presence/Absence of Composite Sheet | Absent | Absent | Absent | Absent | Absent | Absent | Absent | Absent |
| | State of Foam | Void | Void | Hole | Hole | Excellent | Excellent | Excellent | Excellent |
| | Foam Clearance State (4 stages) | × | × | × | × | ○ | ○ | ◎ | ◎ |
| Foam Physical Property | Bending Strength (kg/cm$^2$) | 0.15 | 0.17 | 0.12 | 0.13 | 0.27 | 0.29 | 0.29 | 0.30 |
| | Broken Portion | Foam | Foam | Foam | Foam | Foam | Foam | Foam | Foam |
| | 25% Compressive Strength (kgf/cm$^2$) | 0.63 | 0.75 | 0.40 | 0.45 | 1.09 | 1.12 | 1.19 | 1.23 |
| | Compression Permanent Strain (%) | 7.5 | 7.5 | 4.7 | 4.5 | 6.3 | 6.1 | 6.4 | 6.2 |
| | Thermoformability (5-stage Evaluation) | — | — | — | — | 3 | 3 | 2 | 2 |
| | Thermostability (3-stage Evaluation) | — | — | — | — | × | × | ○ | ○ |

TABLE 3

|  |  | Example | | | | | | | | Comparative Example 1 |
|---|---|---|---|---|---|---|---|---|---|---|
|  |  | 17 | 18 | 19 | 20 | 21 | 22 | 23 | 24 | |
| Resin Compounding Ratio | HDPE |  |  | 20 | 20 | 80 | 80 | 50 | 50 |  |
|  | PP1 |  |  | 80 | 80 | 20 | 20 | 50 | 50 |  |
|  | PP2 | 100 | 100 |  |  |  |  |  |  | 100 |
|  | PP3 |  |  |  |  |  |  |  |  |  |
|  | Silane Crosslinking PP | 20 | 20 | 20 | 20 | 20 | 20 | 20 | 20 | 80 |
| Crosslinking Resin | Viscosity after Croslinking (poise) | 25000 | 25000 | 9400 | 9400 | 14300 | 14300 | 13500 | 13500 | 21000 |
|  | Gel Fraction (wt. %) | 13 | 13 | 13 | 13 | 13 | 13 | 13 | 36 |  |
| Granular Materials | Pellet Thickness (mm) | 2 | 2 | 2 | 2 | 2 | 2 | 2 | 2 | 1.2 |
|  | Dissemination Projected Area Ratio (%) | 20.8 | 25.0 | 20.8 | 25.0 | 20.8 | 25.0 | 20.8 | 25.0 | — |
|  | Dissemination State | Multi-layer | Single Layer | Multi-layer | Single Layer | Multi-layer | Single Layer | Multi-layer | Single Layer | Multi-layer |
| Foam | Low Expanded Thin Film Thickness ($\mu$m) | 125 | 150 | 125 | 150 | 125 | 150 | 125 | 150 | 750 |
|  | Low Expanded Thin Film Expansion Ratio (times) | 4 | 3.5 | 4 | 3.5 | 4 | 3.5 | 4 | 3.5 | 1 |
|  | High Expanded Foam Expansion Ratio (times) | 28 | 32 | 28 | 32 | 28 | 32 | 28 | 32 | 43 |
|  | Presence/Absence of Composite Sheet | Absent | Absent | Absent | Absent | Absent | Absent | Absent | Absent | Absent |
|  | State of Foam | Excellent | Excellent | Excellent | Excellent | Excellent | Excellent | Excellent | Excellent | Excellent |
|  | Foam Clearance State (4 stages) | ○ | ○ | ◎ | ◎ | ◎ | ◎ | ◎ | ◎ | Δ |
| Foam Physical Property | Bending Strength (kg/cm$^2$) | 0.28 | 0.29 | 0.29 | 0.30 | 0.29 | 0.30 | 0.30 | 0.31 | 0.076 |
|  | Broken Portion | Foam | Foam | Foam | Foam | Foam | Foam | Foam | Foam |  |
|  | 25% Compressive Strength (kgf/cm$^2$) | 1.20 | 1.22 | 1.32 | 1.36 | 1.25 | 1.30 | 1.28 | 1.38 | 1.11 |
|  | Compression Permanent Strain (%) | 6.4 | 6.1 | 6.1 | 5.9 | 8.0 | 5.8 | 6.2 | 6.9 | 9.1 |
|  | Thermoformability (5-stage Evaluation) | 3 | 3 | 4 | 4 | 4 | 4 | 5 | 5 | 1 |
|  | Thermostability (3-stage Evaluation) | Δ | Δ | ○ | ○ | Δ | Δ | ○ | ○ | ○ |

In Examples 1 to 24, every dissemination was assumed to be 250 g/m$^2$ in dissemination of the thermoplastic resin granular materials A. While omitted in Tables 1 to 3, expansion ratios of the overall foam moldings as obtained are 20 times in every one of Examples 1 to 24 and comparative example 1.

As obvious from Tables 1 to 3, it is understood that bending strength values were extremely improved to at least 0.12 kg/cm$^2$ in the foams of Examples 1 to 24 although the bending strength of the obtained foam molding was low at 0.076 kg/cm$^2$ in comparative example employing a bead expansion/forming method of carrying out pre-expansion and making expansion again in forming. This is because the foams were obtained by the inventive preparation method in Examples 1 to 6 and Examples 9 to 24, and the overall outer surfaces of the high expanded foams were covered with the low-expanded-foam thin layers in the foams so that the low density foams were thermally fused with each other through the low-expanded-foam thin layers.

Further, it is understood that bending strength values are higher in the foams in which high expanded foams were formed not to overlap with each other along the thickness directions as compared with the multilayer foams consisting of the same compositions. Comparing Example 1 and Example 2 with each other, for example, it is understood that Example 2 in which the high expanded foams are not superposed with each other along the thickness direction has higher bending strength as compared with Example 1.

Similarly, it is understood that Examples 4, 6, 8, 10, 12, 14, 16, 18, 20, 22 and 24 have higher bending strength values as compared with Examples 3, 5, 7, 9, 11, 13, 15, 17, 19, 21 and 23.

Further, it is understood that bending strength values are higher in Examples 5 to 8 and Examples 13 to 24 in which the expansion ratios of the low-expanded-foam thin layers are in the range of 1.1 to 10 times and the thicknesses thereof are in the range of 30 to 500 $\mu$m as compared with Examples 1 to 4 and Examples 9 to 12, and hence foams having higher bending strength values were obtained while effectuating lightweightness.

In addition, it is understood that composite sheets consisting of reinforcing fiber and the thermosetting resins are stacked on both surfaces in Examples 7 and 8 and hence the bending strength values are effectively improved as 0.51 kg/cm$^2$ and 0.57 kg/cm$^2$ respectively.

In Examples 9 to 12, on the other hand, bending strength values were low as compared with the remaining Examples since the dissemination projected area rates of the thermosetting resin granular materials A were out of the range of 10 to 75%. Therefore, it is understood that a foam having high bending strength can be obtained by bringing the dissemination projected area ratio of the thermosetting resin granular materials A into the range of 10 to 75%.

Further, it is understood that foaming cell states are excellent in Examples 15, 16 and 19 to 24 in which melt viscosity values of the expandable thermoplastic resins employed for obtaining the thermoplastic resin granular materials A are in the range of 5000 to 20000 poise at 190° C. and hence homogeneous and fine foam cells are homogeneously dispersed. Thus, it is understood that foams having higher bending strength values are obtained. For example, Example 13 and Example 15 were executed similarly to each other except that the melt viscosity values and the gel fractions of the aforementioned thermosetting resins were changed, while the bending strength was improved to 0.29 kg/cm$^2$ in Example 15 although that of Example 13 was 0.27 kg/cm$^2$. Similarly, the bending strength was improved to 0.30 kg/cm$^2$ in Example 16 although the bending strength was 0.29 kg/cm$^2$ in Example 14. Comparing Example 17 and Example 19 with each other, further, it is understood that the bending strength was improved to 0.29 kg/cm$^2$ in Example 19 while that of Example 17 was 0.28 kg/cm$^2$, although only viscosity values of the expandable thermosetting resins were different. Therefore, it is understood that foaming cells are further homogeneously and finely formed and a foam which is improved in bending strength is obtained by bringing the melt viscosity of the expandable thermoplastic resins into the aforementioned specific range.

Further, it is understood that foams which are excellent in balance between thermoformability and thermostability can be obtained in Examples 17 to 24 in which the gel fractions of the expandable thermoplastic resins are in the range of 10 to 30 percent by weight. Namely, thermoformability levels are in evaluation of at least 3 in Examples 17 to 24, while thermostability levels maintain evaluation of at least Δ. In Examples 1 to 16, on the other hand, results capable of satisfying both of thermoformability and thermostability as described above are not obtained.

In addition, it is understood that Examples 23 and 24 in which two types of non-crosslinked thermoplastic resins being hardly compatible with each other are blended in rates in the range of 3:7 to 7:3 in weight ratio are excellent in both of thermoformability and thermostability while bending strength values are further improved as 0.30 kg/cm$^2$ and 0.31 kg/cm$^2$.

Figure 3:
FIG. 3 is an electron microphotograph enlarging a high expanded portion of a foam obtained in Example 23 to 20,000 times.

FIG. 3 is an electron microphotograph enlarging a part of a low density foam of a foam according to the present invention comprising high expanded foams and low-expanded-foam thin layers covering outer surfaces thereof to 20,000 times, and as understood from this photograph, it can be confirmed that portions having high crosslinking density being made crosslinking preferential, i.e., portions having high density in the photograph, and hardly crosslinked portions having low crosslinking density, i.e., portions having low density in the photograph, form a island-sea structure. Since the hardly crosslinked portions having low crosslinking density are thus present and these portions have flowability in forming, the foam according to the present invention is rendered excellent in thermoformability.

While it is said that 25% compressive strength must be at least 0.6 kgf/cm$^2$ and the compression set must be not more than 10% in a roof insulator, 25% compressive strength values are at least 0.6 kgf/cm$^2$ and compression sets are rendered not more than 10% in Examples 1 to 24. Namely, it is understood that foams well-balanced between compressive strength and compression set are obtained.

We claim:

1. A foam comprising:
   high-expanded-foams consisting of thermoplastic resins; and
   low-expanded-foam layers consisting of thermoplastic resins, having an expansion ratio of 1.1 to 10 times, covering outer surfaces of said high-expanded-foams consisting of said thermoplastic resins;
   said high-expanded-foams having an expansion ratio higher than the expansion ratio of said low-expanded-foams;
   wherein said thermoplastic resins have preferentially crosslinked portions having high crosslinking density and crosslinked portions having low crosslinking density, said portions forming a island-sea structure; and
   a plurality of said high-expanded-foams being thermally fused with each other through said low-expanded-foam layer.

2. The foam in accordance with claim 1, wherein said high-expanded-foams consist of said thermoplastic resins being covered with said low-expanded-foam thin layers, and are arranged as a single layer so as not to overlap with each other, and are thermally fused with each other through said low-expanded-foam thin layers along a transverse direction.

3. A method of preparing a foam comprising:
   disseminating expandable thermoplastic resin pellets or annular substances containing a foaming agent in a region enclosed with outer edges; and
   expanding said thermoplastic resin pellets or annular substances by heating the same to a temperature exceeding the foaming temperature of said foaming agent being contained in said expandable thermoplastic resin pellets or annular substances, wherein the resin gel fraction in said expandable thermoplastic resin is 10 to 30 percent by weight; and
   wherein said expandable thermoplastic resin pellets or annular substances are so disseminated that said expandable thermoplastic resin pellets or annular substances occupy 10 to 75 percent of said region enclosed with outer edges.

4. A method of preparing a foam comprising:
   disseminating expandable thermoplastic resin pellets or annular substances containing a foaming agent in a single layer so as not to overlap each other; and
   expanding said expandable thermoplastic resin pellets or annular substances by heating the same to a temperature exceeding the foaming temperature of said foaming agent being contained in said expandable thermoplastic resins wherein the resin gel fraction in said expandable thermoplastic resin is 10 to 30 percent by weight.

5. A method of preparing a foam comprising:
   disseminating expandable thermoplastic resin pellets or annular substances containing a foaming agent in a region enclosed with outer edges, said expandable thermoplastic resin containing 100 parts by weight of a thermoplastic resin composition containing two types of non-crosslinked thermoplastic resins being hardly compatible with each other and being prepared by mixing said two types of non-crosslinked thermoplastic resins in the range of 3:7 to 7:3 in weight ratio,
   1 to 50 parts by weight of silane modified thermoplastic resins employing thermoplastic resins being of the same type as one of said non-crosslinked thermoplastic resins,
   a silane crosslinking catalyst, and
   a foaming agent; and
   expanding said thermoplastic resin pellets or annular substances by heating the same to a temperature exceeding the foaming temperature of said foaming agent being contained in said expandable thermoplastic resin pellets or annular substances;

wherein said expandable thermoplastic resin pellets or annular substances are so disseminated that said expandable thermoplastic resin pellets or annular substances occupy 10 to 75 percent of said region enclosed with outer edges.

6. A method of preparing a foam comprising:

disseminating expandable thermoplastic resin pellets or annular substances containing a foaming agent in a single layer so as not to overlap each other, said expandable thermoplastic resin containing 100 parts by weight of a thermoplastic resin composition containing two types of non-crosslinked thermoplastic resins being hardly compatible with each other and being prepared by mixing said two types of non-crosslinked thermoplastic resins in the range of 3:7 to 7:3 in weight ratio, 1 to 50 parts by weight of silane modified thermoplastic resins employing thermoplastic resins being of the same type as one of said non-crosslinked thermoplastic resins, a silane crosslinking catalyst, and a foaming agent; and expanding said expandable thermoplastic resin pellets or annular substances by heating the same to a temperature exceeding the foaming temperature of said foaming agent being contained in said expandable thermoplastic resins.

* * * * *